United States Patent [19]

Goldstein et al.

[11] Patent Number: 5,228,958
[45] Date of Patent: Jul. 20, 1993

[54] REGENERATING SLURRIES FOR USE IN ZINC-AIR BATTERIES

[75] Inventors: Jonathan Goldstein, Jerusalem; Arieh Meitav, Rishon Lezion, both of Israel

[73] Assignee: Electric Fuel Limited, Jerusalem, Israel

[21] Appl. No.: 636,411

[22] Filed: Dec. 31, 1990

[51] Int. Cl.$^5$ .................................. C25C 1/16
[52] U.S. Cl. ............................. 204/115; 204/116; 429/49
[58] Field of Search ............... 204/114, 115, 116; 429/49

[56] References Cited

U.S. PATENT DOCUMENTS

| | | | |
|---|---|---|---|
| 3,847,671 | 11/1974 | Leparulo et al. | 429/18 |
| 3,981,747 | 9/1976 | Doniat et al. | 429/15 |
| 4,341,847 | 7/1982 | Sammells | 429/40 |
| 4,448,858 | 5/1984 | Graf et al. | 429/19 |
| 5,006,424 | 4/1991 | Evans et al. | 429/15 |

*Primary Examiner*—John Niebling
*Assistant Examiner*—Kathryn Gorges
*Attorney, Agent, or Firm*—Helfgott & Karas

[57] ABSTRACT

A process for the regeneration of an at least partially spent Zn-alkali slurry for use in metal-air batteries, including subjecting the slurry to at least the steps of (i) separating the slurry into dissolved and undissolved phases; (ii) electrolyzing the separated dissolved phase so that Zn deposits on a cathode in removable form; (iii) removing Zn from the cathode and consolidating the Zn into particles; and (iv) combining the Zn from step (iii) with the separated undissolved phase from step (i) and an additional aqueous Group Ia metal hydroxide.

20 Claims, No Drawings

REGENERATING SLURRIES FOR USE IN ZINC-AIR BATTERIES

FIELD AND BACKGROUND OF THE INVENTION

The present invention relates to a process for the regeneration of a slurry used in rechargeable zinc-air batteries, generally, and more particularly, to such rechargeable electric batteries intended for use in electric vehicles and energy storage systems.

Various proposals have been made in the past for electric powered vehicles. To date, for a number of reasons, electric vehicle systems have yet to become commercially viable, generally, for urban and highway applications.

There have been proposals to employ zinc/air batteries for urban vehicle propulsion. An example is the following publication: Improved slurry zinc/air systems as batteries for urban vehicle propulsion, by P. C. Foller, Journal of Applied Electrochemistry 16 (1986), 527–543.

Metal/air battery structures are described in the following publications: U.S. Pat. No. 4,842,963, entitled Zinc Electrode and Rechargeable Zinc-Air Battery; U.S. Pat. No. 4,147,839, entitled Electrochemical Cell with Stirred Slurry; U.S. Pat. No. 4,908,291, entitled Metal/air Battery with Recirculating Electrolyte; U.S. Pat. No. 3,847,671, entitled Hydraulically-Refuelable Metal-Gas Depolarized Battery System; U.S. Pat. No. 4,925,744, entitled Primary Aluminum-Air Battery; U.S. Pat. No. 3,716,413, entitled Rechargeable Electrochemical Power Supply; U.S. Pat. No. 4,925,744, entitled Primary Aluminum-Air Battery. In U.S. Pat. No. 3,592,698, entitled Metal Fuel Battery with Fuel Suspended in Electrolyte, there is described inter alia a method for circulating an electrolyte/metal fuel powder mixture through the batteries; U.S. Pat. No. 4,126,733, entitled Electrochemical Generator Comprising an Electrode in the Form of a Suspension, relates to a similar subject using a circulated suspension of inert cores coated with an electrochemically active material. In U.S. Pat. No. 4,341,847, entitled "Electrochemical Zinc-Oxygen Cell", there is described a method in which an electrolyte is circulated in the annular space between concentric electrodes.

Electrical energy storage systems are described in the following publications: U.S. Pat. No. 4,843,251 entitled Energy Storage and Supply Recirculating Electrolyte; Energy on Call by John A. Casazza et al, IEEE Spectrum June, 1976, pp 44–77; U.S. Pat. No. 4,275,310, entitled Peak Power Generation; U.S. Pat. No. 4,124,805, entitled Pollution-Free Power Generating and Peak Power Load Shaving System; U.S. Pat. No. 4,797,566, entitled Energy Storing Apparatus.

Regeneration of spent zinc-containing alkaline electrolyte is described in a number of prior patents. For example, in U.S. Pat. No. 3,847,671 (mentioned above) whole spent electrolyte is subjected to electrolysis, when zinc deposited at the cathode is removed with a wiper blade. The thus-removed zinc is said to be substantially heavier than the electrolyte (35–40% KOH) and thus falls to the bottom of each cell. In a particular embodiment, the cathode and anode are specified as being made from copper (or silver-plate copper) and carbon, respectively. In U.S. Pat. No. 3,981,747, it is proposed to regenerate the spent zinc in an alkaline electrolyte by reaction with a strongly electronegative metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by merely mechanically replacing zinc oxide particles by active zinc particles.

The disclosures of all of the foregoing publications (including patents) are explicitly incorporated herein by reference.

SUMMARY OF THE INVENTION

It is an object of the present invention to make possible from a practical point of view, the general commercial viability of metal-air batteries, more particularly for use in electric vehicle propulsion and energy storage systems.

A more specific object of the invention is to provide a process for regenerating a rechargeable slurry for use in metal-air batteries. Other objects of the invention will become apparent from the description which follows.

The present invention accordingly provides a process for the regeneration of an at least partially spent slurry for use in metal-air batteries which slurry comprises an admixture of at least components (a) and (b), of the following components (a), (b), (c), (d), (e), (f) and (g):

(a) zinc which has been at least partly oxidized to an oxidation product selected from zinc oxide, zinc hydroxide and zincates;

(b) an aqueous solution of at least one Group Ia metal comprising anions selected from hydroxide and zincate;

(c) an inorganic inhibitor ingredient effective to inhibit the interaction of zinc and at least one Group Ia metal hydroxide in aqueous solution, which would otherwise result in the evolution of hydrogen gas; (d) a gelling agent; (e) a particulate and/or fibrous filler; (f) a labelling agent; (g) a dissolved electrolyte extender.

Our copending patent application Ser. No. 636,426 describes and claims slurries for use in metal-air batteries, which comprise essentially at least ingredients (a), (b) and (c), above, but in which component (a) is defined as particles comprising a metal selected from the group consisting of aluminum, iron and zinc, and component (b) is defined as an aqueous solution of at least one Group Ia metal hydroxide. The entire disclosure of the said copending application is explicitly incorporated herein by reference.

The process of the invention comprises subjecting the at least partially spent slurry, after optional dilution with at least one of aqueous Group Ia metal hydroxide(s) and water, to at least steps (i), (ii), (iii) and (iv), of the following six steps, namely:

(i) separating of the dissolved and undissolved phases;

(ii) electrolyzing the separated dissolved phase, in a cell with a corrosion-resistant anode and a non-zinc-adherent cathode such that the zinc which deposits thereon self-detaches or is removable by a method selected from brushing and the use of liquid jets, until no more than a preselected amount of zinc remains in the solution, provided that the current density at the cathode is preselected so that in conjunction with the non-zinc-adherent characteristic of the cathode, the electro-won zinc will have, after consolidating into particles, a density within the range 0.3–1.4 g./cc and a surface area within the range 0.5–6.0 $m^2$/g.;

(iii) removing zinc from the cathode and consolidating it into particles, as e.g. by brushing or pumping;

(iv) combining zinc from step (iii) with the separated undissolved phase from step (i) and additional aqueous Group Ia metal hydroxide, and if desired, other makeup components, thereby reconstituting charged slurry;

(v) analyzing at least one (A), (B) and (C), namely:

(A) the separated undissolved phase from step (i) prior to combining step (iv); (B) the separated dissolved phase from step (i) prior to combining step (iv); (C) the reconstituted charged slurry obtained in step (iv);

in order to ascertain whether at least the amount of zinc and the amount and concentration in the aqueous medium of the Group Ia metal hydroxide(s), lie within predetermined limits, and if desired, to ascertain also whether the amount of at least one of the hereinafter recited optional slurry components, to the extent that they may be present, lie within predetermined limits, namely: inorganic inhibitor, gelling agent, filler labelling agent and dissolved electrolyte extender;

(vi) adjusting the amounts to within predetermined limits of at least one of the following in the reconstituted charged slurry, namely, zinc, Group Ia metal hydroxide(s), water, inorganic inhibitor, gelling agent, filler, labelling agent and dissolved electrolyte extender.

DETAILED DESCRIPTION OF THE INVENTION

In the reconstituted charged slurry obtained by the process of the invention, the weight ratio zinc: aqueous Group Ia metal hydroxide(s) solution is preferably 1:0.5–2.0, and when component (c) is present the preferred zinc: (c) weight ratio is 1:0.0005–0.04. Components (d), (e), (f) and (g), if any or all of these are present in the reconstituted charged slurry, are preferably present within the following weight percentages based on the weight of the total slurry, namely, (d) 0.3–3.0%, (e) 1.0–10.0%, (f) 0.001–1.0% and (g) 0.1–10.0%, provided that the percentage of zinc in the slurry is within the range of 33.3–67.0 wt. %, preferably 45.0–60.0 wt. %.

It is preferred that in step (ii) the current density at the cathode (which may be, for example, within the range 10–600 milliamp./cm$^2$) is preselected so that in conjunction with the non-zinc-adherent characteristic of the cathode, the electrowon zinc will have, after consolidating into a particular structure, a density within the range 0.3–1.1 g./cc and a surface area within the range 0.75–5.0 m$^2$/g.

Exemplary non-zinc-adherent cathodes may be made of, e.g., magnesium, titanium or stainless steel. An exemplary corrosion-resistant anode may be made of, e.g., nickel, sintered nickel, or nickel mesh with a surface coating of cobalt/nickel oxide catalyst.

The electrolysis step may, for example, be carried out at a temperature within the range 20°–35° C., e.g. for a time period of between 10 and 60 minutes. It is also contemplated that the electrolysis step may be carried out continuously, as part of an overall continuous or semi-continuous regeneration process.

Illustratively, the dissolved phase separated in step (i) may be from 5 to 12 molar in potassium ions and may contain from 1 to 100 g./l. dissolved zinc. The electrolysis may be carried out until (by way of example) no more than 20 g./l. of zinc remains in the solution.

The process of the invention will now be illustrated by the following non-limitative Example.

EXAMPLE

A zinc-containing electrolyte slurry was prepared for discharge in a zinc-air cell. The slurry was made by thoroughly mixing together zinc powder (50 g., 30 mesh, having a density and surface area, respectively, of approximately 0.6 g./cc. and 1.0 m$^2$/g.), 30 wt. % aqueous potassium hydroxide solution (40 g.), Acheson graphite (7.5 g.) as conductive filler, mercuric oxide (2 g.) as zinc-corrosion inhibitor and polyacrylic acid (0.5 g.) as gelling agent. The slurry had a density of approximately 2 g./ml.; it was a gel-like suspension which exhibited no segregation of zinc particles and no appreciable generation of hydrogen over a time period.

There was about 25 ml. slurry introduced into the slurry compartment of a zinc-air cell, when about 10 Ahr. of discharge capacity was observed, 1 A for 10 hours at an average voltage of 1.2 V until a 1 V cutoff. At this point, there was only about one-half of the zinc had actually been discharged.

The partially discharged slurry was rinsed out of the cell with the aid of about 250 ml. 30 wt. % aqueous potassium hydroxide solution containing 2 wt. % dissolved zinc oxide. The slurry/rinsing solution mixture was stirred for about 30 minutes at 50° C. This mixture contained dissolved potassium zincate, potassium hydroxide and gelling agent, and undissolved zinc particles, corrosion inhibitor and graphite filler.

The solid and liquid components were separated by filtration through porous nylon and the filtered solids were retained for later reformulation. The clear filtrate was transferred to an electrolytic bath which contained two immersed nickel anodes flanking a central stainless steel cathode. Each plate had the dimensions 50×50×1 mm. and was fitted with current carrying leads; there was a 10 mm. space on each side between the cathode and the anodes.

The electrolyte was circulated at a rate of 25 ml./minute while a current of 25 A was applied (500 milliamp/cm$^2$ at the cathode) at a voltage of 3 V. The bath temperature was maintained at 20°–30° C. by external cooling. The electrolyte returning from the cooler was directed so as to stream between the plates, entering at the base of the bath and exiting at above the level of the top of the plates, thereby immediately removing the hot liquid zone and any gas bubbles. From time to time, deionized water or alkali was added to the bath to maintain the alkali concentration.

The cathode was transferred to a separate container every ten minutes, where the deposited zinc was removed and consolidated into a particulate structure by means of a revolving nylon brush, while a clean cathode was placed in the electrolytic bath to continue the zinc recovery process. The brush was operated at 1000 rpm for three minutes, which afforded alkali-moist zinc particles below about 30 mesh particle size, suitable for reformulation of the slurry for re-use in the battery discharge process. The zinc particles had a density of 0.7 g./cc and a surface area of 1.1 m$^2$/g. After about 30 minutes of electrolyzing the separated liquid phase from the discharged slurry, the bath was found on analysis to contain about 2 wt. % zinc, the original concentration of the slurry rinse-out solution. This indicated that all of the zinc in the dissolved phase of the discharged slurry had been recovered. On a duplicate run, with washing (to remove alkali) and drying of the electrolytically recovered zinc, the dry zinc content of the particles was about 12.5 g., indicating a current efficiency of about 80% at the specified current density.

Approximately, 25 ml. of slurry were reconstituted for a further discharge cycle in the zinc-air cell. The alkali-moist zinc particles were mixed with the solid residue from the nylon filter and 10 ml. more of alkaline rinse solution. The mixture was stirred for one hour to ensure adequate equilibration of the inhibitor additive with freshly regenerated zinc particles. An extra make-up quantity of 0.25 wt. % polyacrylic acid gelling agent was added to the reformulated slurry, because, the gelling agent previously present in the electrolyte had been unduly diluted and to some extent destroyed by the recovery process steps. The slurry now appeared gel-like as before and exhibited neither obvious segregation of zinc particles nor generation of hydrogen bubbles. In the zinc air cell, it gave an equivalent discharge performance to the first run. The Zn:K ratio in the slurry (which contained approximately 50 wt. % Zn), as determined by atomic absorption spectroscopy, was about 6:1.

While the invention has been particularly described, it will be appreciated by persons skilled in the art that many modifications and variations are possible. The invention is accordingly not to be construed as limited to the particularly described embodiments, rather its concept, scope and spirit are to be understood in the light of the claims which follow.

We claim:

1. A process for the regeneration of an at least partially spent slurry having a dissolved phase and an undissolved phase for use in metal-air batteries which slurry comprises an admixture of at least components (a) and (b), of the following components (a), (b), (c), (d), (e), (f) and (g):
   (a) zinc which has been at least partly oxidized to an oxidation product selected from the group consisting of zinc oxide, zinc hydroxide and zincates; (b) an aqueous solution of at least one Group Ia metal comprising anions selected from the group consisting of hydroxide and zincate; (c) an inorganic inhibitor effective to inhibit the interaction of zinc and at least one Group Ia metal hydroxide in aqueous solution, which would otherwise result in the evolution of hydrogen gas; (d) a gelling agent; (e) a filler selected from the group consisting of particulate and fibrous fillers; (f) a labelling agent; (g) a dissolved electrolyte extender;
which process comprises subjecting the at least partially spent slurry to at least steps (i), (ii), (iii) and (iv) of the following six steps:
   (i) separating of the dissolved and undissolved phases;
   (ii) electrolyzing the separated dissolved phase, in a cell with a corrosion-resistant anode and a non-zinc-adherent cathode such that the zinc which deposits thereon self-detaches or is removable by a method selected from brushing and the use of liquid jets, until no more than a preselected amount of zinc remains in the solution, provided that the current density at the cathode is preselected so that in conjunction with the non-zinc-adherent characteristic of the cathode, the electrowon zinc will have, after consolidating into particles, a density within the range 0.3–1.4 g./cc and a surface area within the range 0.5–6.0 m²/g.;
   (iii) removing zinc from the cathode and consolidating it into particles;
   (iv) combining zinc from step (iii) with the separated undissolved phase from step (i) and additional aqueous Group Ia metal hydroxide, thereby reconstituting charged slurry;
   (v) analyzing at least one of following (A), (B) and (C):
      (A) the separated undissolved phase from step (i) prior to combining step (iv); (B) the separated dissolved phase from step (i) prior to combining step (iv); (C) the reconstituted charged slurry obtained in step (iv);
   in order to ascertain whether at least the amount of zinc and the amount and concentration in the aqueous medium of the Group Ia metal hydroxide lie within predetermined limits, and to ascertain also whether the amount of at least one of the hereinafter recited slurry components, to the extent that they may be present, lie within predetermined limits: inorganic inhibitor, gelling agent, filler, labelling agent and dissolved electrolyte extender;
   (vi) adjusting the amounts to within predetermined limits of at least one of the following in the reconstituted charged slurry: zinc, a Group Ia metal hydroxide, water, inorganic inhibitor, gelling agent, filler, labelling agent and dissolved electrolyte extender.

2. Process according to claim 1 wherein said at least partially spent slurry is diluted with a solution of at least one Group Ia metal hydroxide and water prior to subjecting said slurry to said steps (i), (ii), (iii) and (iv).

3. Process according to claim 2 in which steps (v) and (vi) are carried out, and in which the said predetermined limits recited in step (vi) are such that the weight ratio zinc: Group Ia metal hydroxide solution is adjusted to within the range preferably 1:0.5–2.0; when component (c) is present the zinc: (c) weight ratio is adjusted to within the range 1:0.0005–0.04; and if at least one of components (d), (e), (f) and (g) is present in the reconstituted charged slurry, adjusting said components to within the following weight percentages based on the weight of the total slurry, namely, (d) 0.3–3.0%, (e) 1.0–10.0%, (f) 0.001–1.0% and (g) 0.1–10.0%, provided that the percentage of zinc in the slurry is adjusted to within the range of 33.3–67.0 wt. %.

4. Process according to claim 1, wherein in step (ii) the current density at the cathode is preselected so that in conjunction with the non-zinc-adherent characteristic of the cathode, the deposited zinc will have a density within the range 0.3–1.1 g./cc and a surface area within the range 0.75–5.0 m²/g.

5. Process according to claim 1, wherein the preselected current density at the cathode lies within the range 10–600 milliamp./cm² and the cathode is selected from the group consisting of magnesium, titanium and stainless steel cathodes.

6. Process according to claim 3, wherein the anode used is nickel anode.

7. Process according to claim 1, wherein the electrolysis is carried out at a temperature within the range 20°–35° C.

8. Process according to claim 1, wherein the dissolved phase separated in step (i) is from 5 to 12 molar in potassium ions and contents from 1 to 100 g./l. dissolved zinc.

9. Process according to claim 1, wherein the electrolysis is carried out in a continuous manner.

10. A process for the regeneration of an at least partially spent slurry having a dissolved phase and an undissolved phase for use in metal-air batteries which slurry comprises an admixture of at least components (a), (b) and (c), of the following components (a), (b), (c), (d), (e), (f) and (g):
   (a) zinc which has been at least partly oxidized to an oxidation product selected from the group consisting of zinc oxide, zinc hydroxide and zincates; (b) an aqueous solution of at least one Group Ia metal comprising anions selected from the group consisting of hydroxide and zincate; (c) an inorganic inhibitor effective to inhibit the interaction of zinc and at least one Group Ia metal hydroxide in aqueous solution, which would otherwise result in the evolution of hydrogen gas; (d) a gelling agent; (e) a filler selected from the group consisting of particulate and fibrous fillers; (f) a labelling agent; (g) a dissolved electrolyte extender;

which process comprises subjecting the at least partially spent slurry, after dilution with at least one of aqueous Group Ia metal hydroxide and water, to at least steps (i), (ii), (iii) and (iv) of the following six steps:

(i) separating of the dissolved and undissolved phases;

(ii) electrolyzing of the separated dissolved phase, in a cell with a corrosion-resistant anode and a non-zinc-adherent cathode such that the zinc which deposits thereon self-detaches or is removable by a metal selected from brushing and the use of liquid jets, until no more than a preselected amount of zinc remains in the solution, provided that the current density at the cathode is preselected within the range 10–600 milliamp./cm$^2$, so that in conjunction with the non-zinc adherent characteristic of the cathode, the electrowon zinc will have, after consolidating into particles, a density within the range 0.3–1.4 g./cc and a surface area within the range of 0.5–6.0 m$^2$/g.;

(iii) removing zinc from the cathode and consolidating it into particles;

(iv) combining zinc from step (iii) with the separated undissolved phase from step (i) and additional aqueous Group Ia metal hydroxide, and other makeup components, thereby reconstituting charged slurry;

(v) analyzing at least one of the following (A), (B) and (C):

(A) the separated undissolved phase from step (i) prior to combining step (iv); (B) the separated dissolved phase from step (i) prior to combining step (iv); (C) the reconstituted charged slurry obtained in step (iv);

in order to ascertain whether at least the amount of zinc, the amount and concentration in the aqueous medium of the Group Ia metal hydroxide, and the amount of inorganic inhibitor lie within predetermined limits, and, to ascertain also whether the amount of at least one of the hereinafter recited slurry components, to the extent that they may be present, lie within predetermined limits: gelling agent, filler, labelling agent and dissolved electrolyte extender;

(vi) adjusting the amounts to within predetermined limits of at least one of the following in the reconstituted charged slurry: zinc, Group Ia metal hydroxide, water, inorganic inhibitor, gelling agent, filler, labelling agent and dissolved electrolyte extender.

11. Process according to claim 10 in which steps (v) and (vi) are carried out, and in which the said predetermined limits recited in step (vi) are such that the weight ratio zinc: Group Ia metal hydroxide solution: inorganic inhibitor is adjusted to within the range 1:0.5–2.0:0.0005–0.04; and if at least one of components (d), (e), (f) and (g) is present in the reconstituted charged slurry, adjusting said components to within the following weight percentages based on the weight of the total slurry, namely, (d) 0.3–3.0%, (e) 1.0–10.0%, (f) 0.001–1.0% and (g) 0.1–10.0%, provided that the percentage of zinc in the slurry is adjusted to within the range of 33.3–67.0 wt. %.

12. Process according to claim 10, wherein the cathode is selected from the group consisting of magnesium, titanium and stainless steel cathodes, and the anode used is a nickel anode.

13. Process according to claim 10, wherein the electrolysis is carried out at a temperature within the range 20°–35° C.

14. Process according to claim 10, wherein the dissolved phase separated in step (i) is from 5 to 12 molar in potassium ions and contains from 1 to 100 g./l. dissolved zinc.

15. Process according to claim 10, wherein the electrolysis is carried out in a continuous manner.

16. A process for the regeneration of an at least partially spent slurry having a dissolved phase and an undissolved phase for use in metal-air batteries which slurry comprises an admixture of at least components (a), (b) and (c), of the following components (a), (b), (c), (d), (e), (f) and (g):

(a) zinc which has been at least partly oxidized to an oxidation product selected from the group consisting of zinc oxide, zinc hydroxide and zincates; (b) an aqueous solution of at least one Group Ia metal comprising anions selected from the group consisting of hydroxide and zincate; (c) an inorganic inhibitor effective to inhibit the interaction of zinc and at least one Group Ia metal hydroxide in aqueous solution, which would otherwise result in the evolution of hydrogen gas; (d) a gelling agent; (e) a filler selected from the group consisting of particulate and fibrous fillers; (f) a labelling agent; (g) a dissolved electrolyte extender;

which process comprises subjecting the at least partially spent slurry, after dilution with at least one aqueous Group Ia metal hydroxide and water, to the following six steps:

(i) separating of the dissolved and undissolved phases;

(ii) electrolyzing the separated dissolved phase, in a cell with a corrosion-resistant anode and a non-zinc-adherent cathode such that the zinc which deposits thereon self-detaches or is removable by a metal selected from brushing and the use of liquid jets, until no more than a preselected amount of zinc remains in the solution, provided that the current density at the cathode is preselected within the range 10–600 milliamp./cm$^2$, so that in conjunction with the non-zinc-adherent characteristic of the cathode, the electrowon zinc will have, after consolidating into particles, a density within the range 0.3–1.4 g./cc and a surface area within the range of 0.5–6.0 m$^2$/g.;

(iii) removing zinc from the cathode and consolidating it into particles;

(iv) combining zinc from step (iii) with the separated undissolved phase from step (i) and additional aqueous Group Ia metal hydroxide, and other makeup components, thereby reconstituting charged slurry;

(v) analyzing at least one of the following (A), (B) and (C):

(A) the separated undissolved phase from step (i) prior to combining step (iv); (B) the separated dissolved phase from step (i) prior to combining step (iv); (C) the reconstituted charged slurry obtained in step (iv);

in order to ascertain whether at least the amount of zinc, the amount and concentration in the aqueous medium of the Group Ia metal hydroxide, and the amount of inorganic inhibitor lie within predetermined limits, and, to ascertain also whether the amount of at least one of the hereinafter recited slurry components, to the extent that they may be present, lie within predetermined limits: gelling agent, filler, labelling agent and dissolved electrolyte extender;

(vi) adjusting the amounts to within predetermined limits of at least one of the following in the reconstituted charged slurry: zinc, Group Ia metal hydroxide, water, inorganic inhibitor, gelling agent, filler, labelling agent and dissolved electrolyte extender, said predetermined limits being such that the weight ratio zinc: Group Ia metal hydroxide solution: inorganic inhibitor is adjusted to within the range 1:0.5–2.0:0.0005–0.04; and if at least one of components (d), (e), (f) and (g) is present in the reconstituted charged slurry, adjusting said components to within the following weight percentages based on the weight of the total slurry: (d) 0.3–3.0%, (e) 1.0–10.0%, (f) 0.001–1.0% and (g) 0.1–10.0%, provided that the percentage of zinc in the slurry is adjusted to within the range of 33.3–67.0 wt. %.

17. Process according to claim 16, wherein the cathode is selected from the group consisting of magnesium, titanium and stainless steel cathodes, and the anode used is a nickel anode.

18. Process according to claim 16, wherein the electrolysis is carried out at a temperature within the range 20°–35° C.

19. Process according to claim 16, wherein the dissolved phase separated in step (i) is from 5 to 12 molar in potassium ions and contains from 1 to 100 g./l. dissolved zinc.

20. Process according to claim 16, wherein the electrolysis is carried out in a continuous manner.

* * * * *